United States Patent
Shen et al.

(10) Patent No.: US 9,035,991 B2
(45) Date of Patent: May 19, 2015

(54) COLLABORATION SYSTEM AND METHOD

(71) Applicant: Aastra Technologies Limited, Concord (CA)

(72) Inventors: Francis Shen, Concord (CA); Paulo Francisco, Concord (CA)

(73) Assignee: Mitel Networks Corporation, Ottawa (CA)

( * ) Notice: Subject to any disclaimer, the term of this patent is extended or adjusted under 35 U.S.C. 154(b) by 36 days.

(21) Appl. No.: 13/707,303

(22) Filed: Dec. 6, 2012

(65) Prior Publication Data

US 2013/0141517 A1 Jun. 6, 2013

Related U.S. Application Data

(60) Provisional application No. 61/567,568, filed on Dec. 6, 2011.

(51) Int. Cl.
*H04N 7/15* (2006.01)
*H04L 29/06* (2006.01)

(52) U.S. Cl.
CPC ............. *H04N 7/15* (2013.01); *H04L 65/4038* (2013.01); *H04L 65/4023* (2013.01)

(58) Field of Classification Search
CPC .. H04N 7/15; H04L 65/4023; H04L 65/4038; C07K 2317/22
USPC ........ 345/506; 348/14.03, 14.12; 375/240.12, 375/240.29; 379/88.17, 93.29; 382/218; 709/204; 715/243, 753
See application file for complete search history.

(56) References Cited

U.S. PATENT DOCUMENTS

| | | | |
|---|---|---|---|
| 6,209,021 B1 * | 3/2001 | Ahimovic et al. | 709/204 |
| 6,343,313 B1 * | 1/2002 | Salesky et al. | 709/204 |
| 7,185,054 B1 | 2/2007 | Ludwig et al. | |
| 7,197,751 B2 * | 3/2007 | Fedotov et al. | 719/323 |
| 7,206,811 B2 * | 4/2007 | Skurikhin et al. | 709/205 |
| 7,219,127 B2 * | 5/2007 | Huck et al. | 709/204 |
| 7,222,305 B2 * | 5/2007 | Teplov et al. | 715/751 |
| 7,321,886 B2 * | 1/2008 | Swaminathan et al. | 706/60 |
| 7,535,485 B2 * | 5/2009 | Elbaz et al. | 348/14.12 |
| 8,199,891 B2 * | 6/2012 | Brown et al. | 379/93.17 |
| 8,331,542 B2 * | 12/2012 | Crausaz et al. | 379/93.29 |
| 8,473,851 B2 * | 6/2013 | DeGrazia | 715/753 |
| 8,482,593 B2 * | 7/2013 | Periyannan et al. | 348/14.08 |
| 8,611,509 B1 * | 12/2013 | Basart et al. | 379/88.17 |
| 8,731,307 B2 * | 5/2014 | Kashiwagi | 382/218 |
| 2006/0167997 A1 | 7/2006 | Forstadius | |
| 2007/0050448 A1 * | 3/2007 | Gonen et al. | 709/204 |
| 2008/0209048 A1 * | 8/2008 | Sampath et al. | 709/227 |
| 2012/0191781 A1 * | 7/2012 | Shen et al. | 709/204 |

(Continued)

*Primary Examiner* — Gerald Gauthier

(57) ABSTRACT

A network apparatus in a collaboration system with a plurality of participants, the apparatus comprising: a processing structure; and a memory including computer program code, wherein the memory and the computer program code are configured, with the processing structure, to cause the network apparatus to at least: present content on a display coupled to the processing structure; select a portion of the display for sharing, the portion having the shared content; simultaneously send said shared content to said display and to an encoder for encoding; automatically discover a network server configured to distribute the shared content with the plurality of participants; couple the apparatus to the network server and transmit the shared content to the network server for distribution to at least one of the plurality of participants, such that the shared content is encoded and decoded, and displayed in real-time.

21 Claims, 2 Drawing Sheets

(56) References Cited

U.S. PATENT DOCUMENTS

| | | | |
|---|---|---|---|
| 2012/0207227 A1* | 8/2012 | Tsai et al. | 375/240.29 |
| 2013/0021350 A1* | 1/2013 | Schmit et al. | 345/506 |
| 2013/0114704 A1* | 5/2013 | Chen et al. | 375/240.12 |
| 2013/0117662 A1* | 5/2013 | Shan et al. | 715/243 |
| 2013/0141517 A1* | 6/2013 | Shen et al. | 348/14.03 |
| 2014/0012903 A2* | 1/2014 | Shen et al. | 709/204 |

* cited by examiner

COLLABORATION SYSTEM AND METHOD

CROSS-REFERENCE TO RELATED APPLICATIONS

This application claims the benefit of priority to U.S. Provisional Application Ser. No. 61/567,568, filed on Dec. 6, 2011.

FIELD OF THE INVENTION

The present invention relates to collaboration systems.

BACKGROUND OF THE INVENTION

Collaboration systems are well known. One problem inherent in existing collaboration systems is the inability to easily share desktop content, such as multimedia content. Generally, sharing content on a desktop, or a portion thereof, may be achieved in a number of ways. For example, one such method involves a screen capture procedure using multiple keys or commands, pasting the captured content onto a clipboard, saving the clipboard contents, launching a messaging client, such as an email application program, attaching the clipboard contents to a message, selecting a destination, and finally sending the message.

Other screen sharing solutions often require significant bandwidth to send a full video of the presenter's screen and can often result in slow updates or momentary screen freezes for the participant viewers, and the performance may be greatly compromised by slower network connections. In a typical collaboration system, a plurality of participants is coupled to a multipoint control unit (MCU) which facilitates a video conference between the participants. However, such systems employing MCUs require substantial encoding/decoding resources, bandwidth resources, and associated increased latency.

It is an object of the present invention to mitigate or obviate at least one of the above-mentioned disadvantages.

SUMMARY OF THE INVENTION

In one of its aspects, there is provided a network apparatus in a collaboration system with a plurality of participants, the apparatus comprising: a processing structure; and a memory including computer program code, wherein said memory and said computer program code are configured, with said processing structure, to cause the network apparatus to at least:
  present content on a display coupled to said processing structure;
  select a portion of said display for sharing, said portion having said shared content;
  simultaneously send said shared content for presentation on said display and to an encoder for encoding said shared content;
  automatically discover a network server configured to distribute said shared content with said plurality of participants;
  couple said apparatus to said network server and transmit said shared content to said network server for distribution to at least one of said plurality of participants; and
  whereby said shared content is encoded and decoded, and displayed in real-time.

In another of its aspects, there is provided a method of sharing content presented on a first graphical user interface (GUI) in real-time, the method having the steps of:
  (a) on said first GUI, selecting at least one area having content for sharing;
  (b) simultaneously sending said content present in said at least one area to said first GUI for presentation thereon and to an encoder, said encoder encoding said content using at least one codec;
  (c) transmitting said encoded content to a computing entity configured to distribute said encoded content to at least one recipient;
  (d) decoding said encoded content with said at least one codec at said least one recipient;
  (e) presenting decoded content on a second GUI at said recipient.

In yet another of its aspects, there is provided a non-transitory machine-readable medium comprising coded instructions, said instructions executable by a processor, said coded instructions comprising:
  (a) a first set of instructions coded to determine the availability of a video application server in a collaboration system;
  (b) a second set of instructions coded to couple a computing device to said video application server, said first set of instruction having at least a network address of said video application server, or having the ability to discover said address through a network service;
  (c) a third set of instructions coded to select a portion of a display associated with said computing device, said portion having content for sharing;
  (d) a fourth set of instructions coded for simultaneously sending said shared content to said display for presentation thereon and directing same said shared content to an encoder;
  (e) a fifth set of instructions coded to encode said shared content;
  (f) a sixth set of instructions coded to transmit said encoded shared content in real-time to said video application server for distribution within said collaboration system; and
  whereby said content is shared in real-time.

In yet another of its aspects, there is provided a conferencing system operating over a distributed computer network, a method of sharing desktop content at an originating computer with at least one recipient computer in real-time, the system comprising:
  said originating computer comprising content within at least one selected display region thereof that is to be shared with at least one at least one recipient computer;
  a network server for distribution said shared content;
  at said client computer, a processing structure and a memory including computer program code, wherein said memory and said computer program code are configured, with said processing structure, to cause said originating client computer to at least:
    at said processing structure, receive the coordinates of an area encompassing said at least one selected display region having said shared content;
    simultaneously send said shared content to said display for presentation thereon and direct same said shared content to an encoder;
    encode only said shared content encompassed within said at least one selected display region in real-time;
    automatically discover said network server; transmit said encoded shared content to said network server for distribution to said one at least one recipient computer, such that said shared content is decoded said one at least one recipient computer, and displayed in real-time; and
  whereby transmitting only said encoded content within said area minimizes encoding and de-coding resources and bandwidth resources.

Advantageously, any desktop content, such as video, may be shared easily among participants in real-time, without relying on screen capture techniques and additional hardware. The video content is encoded in real-time using compression techniques which lowers the bitrate for a reduction in bandwidth usage during transmission between the participants. In addition, this desktop sharing method requires less processing resources and bandwidth requirements than prior art methods. The combination of the network apparatus and the video application server solution avoids the need for costly multipoint control units (MCUs), reducing overall costs and additionally reducing MCU quality impacting encoding/de-coding and associated increased latency.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
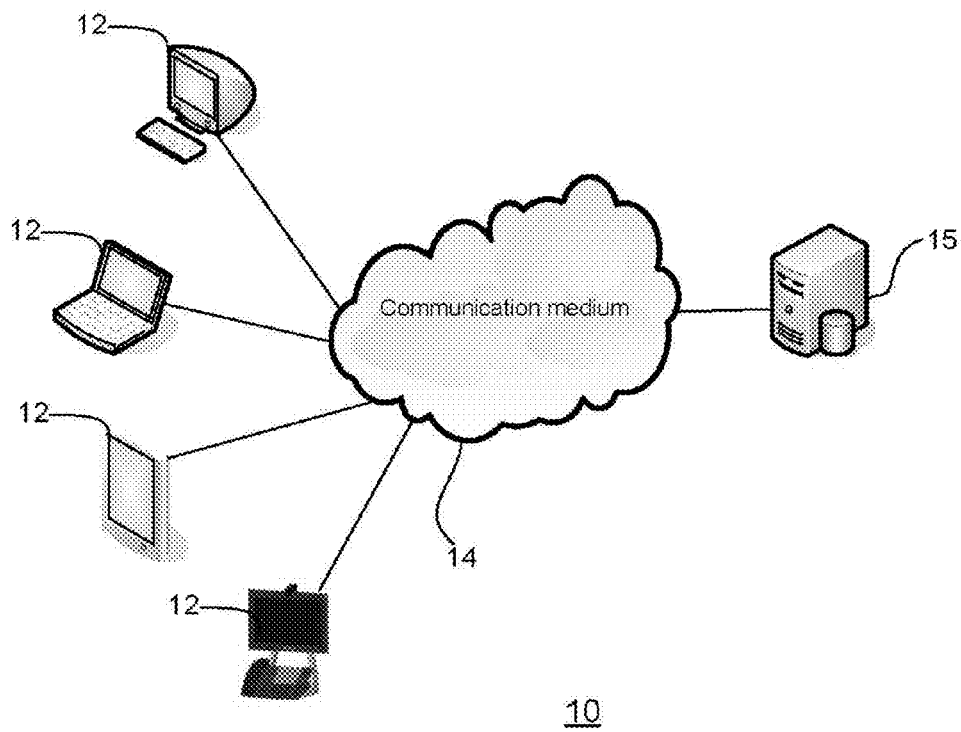
FIG. 1 shows an exemplary collaboration system.

Many of the methods of the invention may be performed with a digital processing system, such as a conventional, general purpose computer system. Special purpose computers which are designed or programmed to perform only one function may also be used. FIG. 1 shows an exemplary collaboration system, generally identified by reference numeral 10, comprising a plurality of participant devices 12 in communication with each other by either wired or wireless connection via a network 14, including at least one video application server (VAS) 15 which facilitates multimedia content sharing, such as video, among the devices 12. In this exemplary embodiment, the network 14 is an intranet within an organization; however the network 14 may alternatively be another network, such as for example, a cellular network, the Internet, or a mixture of different networks.

Figure 2:
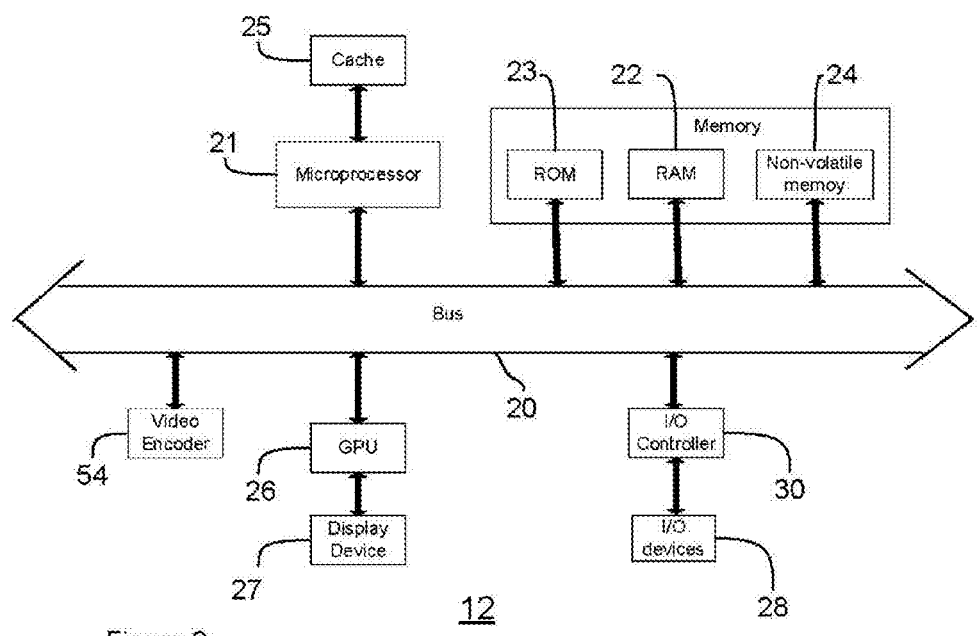
FIG. 2 shows a schematic diagram of an exemplary device in the collaboration system of FIG. 1.

FIG. 2 shows one example of a typical computer system of a device 12. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. As shown in FIG. 2, the computer system, which is a form of a data processing system, includes a bus 20 which is coupled to a microprocessor 21 and a ROM 22 and volatile RAM 23 and a non-volatile memory 24. The microprocessor 21 is coupled to cache memory 25. The bus 20 interconnects these various components together and also interconnects these components 21, 22, 23, and 24 to a graphics processing unit (GPU) 26 and display device 27 and to peripheral devices such as input/output (I/O) devices 28 which may be mice, keyboards, modems, network interfaces, printers, scanners, video cameras, and other devices which are well known in the art. Typically, the input/output devices are coupled to the system through input/output controllers 30. The bus 20 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor 21, executing sequences of instructions contained in a memory, such as a machine readable medium. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 21. The machine readable medium includes any mechanism that provides (i.e., stores and/or transmits) information in a form accessible by a machine (e.g., a computer, network device, personal digital assistant, any device with a set of one or more processors, etc.). For example, machine readable media includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.).

The computing system may be in the form of any kind of general processing structure, and may for example include any device 12, such as, a personal computer, laptop, tablet, computer server, computerized kiosk, personal digital assistant (PDA), cellular phone, smartphone and a videophone. Each device 12 includes a client software module stored in the memory, and having a plurality of program instructions executable by the microprocessor 21, such as a desktop sharing application or a configuration program. The VAS 15 comprises a similar computing system, however, it may further comprise data structures, such as databases. The VAS 15 acts as a mediator for all collaborative communications between participants or authenticated users on devices 12. The VAS 15 runs application server software which host SIP services, a database for storage of configuration settings, user accounts, address books, directories, and web interfaces. SIP services provide signaling functions that facilitate creating and terminating calls between different devices 12. More specifically, SIP services provide mechanisms and communication channels that enable locating participants, negotiating audio and video properties, and setting up data streams to carry audio and video content. These mechanisms are useful within one domain or between servers in different domains.

Figure 3:
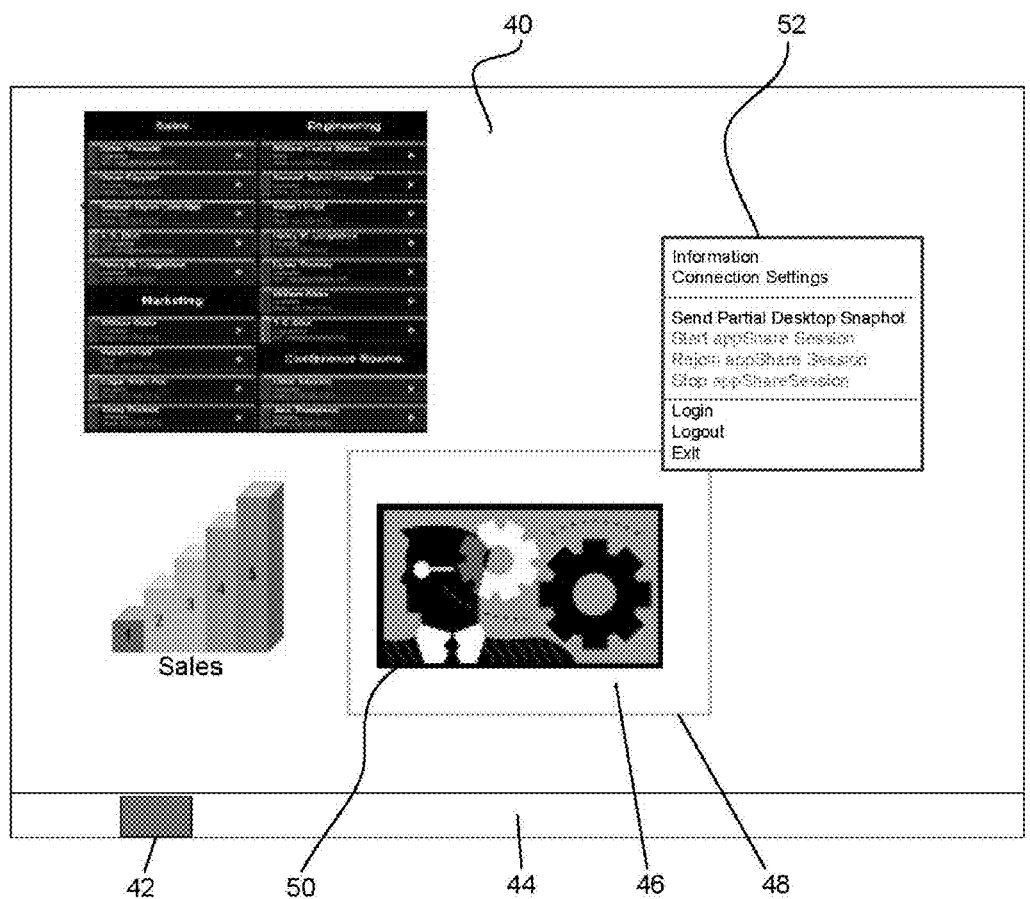
FIG. 3 shows an exemplary desktop with shared content.

Turning to FIG. 3, each of the devices 12 comprises a display device 27 with a screen or touch screen 40, on which a graphical user interface (GUI) and applications are displayed. The GUI includes, but is not limited to, the "desktop" of the operating system, controls such as taskbars and scroll bars, any icons and application windows. The GUI allows desktop content to be presented in windows; and each device 12 runs the desktop sharing application program that permits the devices 12 to share the displayed content.

Generally, after the device 12 is first powered on and communicatively coupled to the network 14 via a network interface, a configuration process is initiated by the client software module on device 12. The client software module configures the device 12 for participation in the collaboration system 10. As an example, the configuration process entails the step of prompting a user at device 12 to enter the network address, such as an IP address, of the VAS 15; and then the client software module automatically determines whether the identified VAS 15 is reachable. This determination may be implemented via a ping command, as is well known in the art, or by other means. When the VAS 15 is coupled to the network 14 and thus reachable, the VAS 15 requests the user to supply login credentials. In one example, these credentials may be the user's Windows Active Directory user id and password, or network credentials, however, the credentials may be unique to the VAS 15, or to the collaboration system 10. Accordingly, the step of determining whether the VAS 15 is reachable enhances the user's experience by bypassing unnecessary "failed to login" error messages common when a network connection can not be established.

Alternatively, the client software module automatically initiates a discovery process to find an available VAS 15, and the device 12 receives the network address, including any other settings, from the VAS 15, via any suitable transport protocol, such as UDP, TCP, TLS, HTTP(S), FTP, or TFTP, in order to auto-configure the device 12. The devices 12 are SIP user agents and register with the VAS 15 and the media between the devices 12 is transmitted via SIP over UDP and TCP.

After the initial successful login, the user is given the option to permit the client software module to automatically login the user for subsequent conferencing sessions, post device 12 boot-up. Once logged in, a desktop sharing application program associated with the client software module is launched, and the associated application window is triggered for display via an appropriate icon 42 in the display task bar 44. The associated application window may be minimized to free up GUI real estate, or closed, however the desktop sharing application program continues to run in the background.

After all the devices 12 participating in the conferencing session are coupled to the VAS 15, each device 12 obtains a list of the other devices 12 in the conferencing session from the VAS 15. As shown in FIG. 3, the device 12 may share at least a portion of its screen 40, e.g., a window, a region of the screen or the full screen, with other devices 12, via the sharing application. Typically, the shared portion may include multimedia data. As an example, during an active video conferencing session a user enables desktop sharing using a dialog box 52 comprising a menu with the available sharing options. The dialog box 52 may be launched via a double click or a touch gesture depending on the screen 40 capabilities. The menu options may be grouped into categories and separated by an appropriate delimiter, such as a horizontal bar. The available sharing options may include, but are not limited to, "Desktop snapshot", "Partial desktop snapshot", and "Share desktop".

In one example, selecting the "Partial Desktop Snapshot" option creates a sharing window 46 bounded by a window frame 48 on the user's desktop 40. To enhance usability, the sharing window 46 may be substantially opaque to help the user distinguish between the desktop 40 and the windowed area 46. The sharing window 46 and window frame 48 are dynamic, that is, they may be moved to any location on the desktop 40 having content 50 for sharing. As an example, the window frame 48 may be moved by left clicking anywhere within the framed window 46, and dragging the framed window 46 to another location while pressing the left mouse button. The framed window 46 may be scaled or resized by left clicking appropriate resize bars, and dragging to an alternate size while pressing the left mouse button. The user can also expand the framed window 46 to full size by left clicking an appropriate expansion icon. Alternatively, the sharing window 46 may be scaled using an appropriate touch gesture. Accordingly, multiple sharing windows 46 may be specified and shared simultaneously. Having determined the desired content 50 for sharing bounded by a suitably dimensioned framed window 46, the user enables sharing of the desired content 50 using a predefined command associated with the desktop sharing application program. For example, another dialog box with a plurality of options is presented prompting the user for an action. The dialog box is activated via a command invoked from an interaction with the framed window 46, such as user input involving a mouse-click or a touch gesture on the framed window 46, or within the framed window 46. One of the options is sharing the desired content 50 with other conference participants, and therefore the user may elect to share the desired content 50 with all conference participants, or may specify particular recipients among the conference participants. The participants are chosen from a directory associated with the Windows Active Directory having the user ids and associated privileges. Accordingly, different sharing windows 46 may be associated with different recipients.

Following the selection of recipients, the boundary defined by the window frame 48 is registered by the microprocessor 21 and the GPU 26. The boundary is specified by coordinates on the desktop 40. Accordingly, in line with the above-mentioned predefined command(s), when the video data for the entire desktop 40 is sent from the GPU content 50 for display on the display device 27, the video data corresponding to the content 50 defined by coordinates of window 46 is intercepted or simultaneously directed to a media encoder, such as video encoder 54, for encoding, thus obviating the need for screen capture techniques.

In one example, the desired content 50 for sharing in window 46 comprises motion video, such that video content 50 is received at the video encoder 54, which performs prediction, transform and encoding processes to form a compressed video bitstream. The video encoder 54 may include any combination of hardware circuitry and software and may include a dedicated Synchronous Dynamic Random Access Memory (SDRAM). The video encoder 54 may be integrated with the GPU 26, or it may be a separate of the GPU 26. Accordingly, the video encoder 54 is instructed by the microprocessor 21 and/or the GPU 26 to encode the selected video content 50 in real-time using compression techniques employing video codecs, such as H.261, H.263, H.264/MPEG-4, or any other format suitable for wide platform playback. Alternatively, the video encoder 54 receives the entire screen 40 content but only processes the desired content 50 in window 46, representing the content 50 to be shared, thus minimizing encoding and de-coding resources and bandwidth resources.

The microprocessor 21 then instructs the transfer of the encoded video data 50 to the device 12's network interface for transmittal in real-time to the VAS 15, or other network devices, using a suitable data transport protocol for video data streaming, such as TCP/IP or RTP/RTCP over UDP. The VAS 15 then receives the video content 50 and transmits the video content 50 in real-time to the specified conference participants authorized to receive the shared content 50. Upon receipt at the conference participant device 12, a video decoder carries out the complementary processes of decoding using the afore-mentioned codecs, inverse transform and reconstruction to produce a decoded video sequence 50 for presentation on the display screen 40 as a live-feed. Accordingly, at the conference participant device 12, the shared content 50 may be viewed within a framed window similar in size to the framed window 46 at the device 12, and the framed window may be scaled as desired by the conference participant. Advantageously, the device 12's entire display screen 40, or a portion thereof, may be shared by streaming its content 50 in real-time to other conference participants without using prior art methods, such as screen capture methods or MCUs.

At any point during the conferencing session the user at the device 12 may elect to terminate sharing of the content 50 by choosing an appropriate command within the dialog box 52, or by simply closing the framed window 46.

In the above examples, the shared content is processed by the device 12 by a video encoder 54 capable of converting the video to a network packet stream, and sent either to the VAS 15 for distribution, or the shared content may be sent directly to the other participants. The VAS 15 provides streaming video solution that allows a user to share live video from any portion of the user's GUI with other participants. However, some of the processing may be performed by the VAS 15 in the VAS distribution model.

The communication network 14 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Although in some of the embodiments described above, input to the system 10 is described primarily via the use of a mouse, those skilled in the art will appreciate that other input means for selection may be used, such as, pointers (pen tools, fingers) on appropriate touch displays.

In another embodiment, the desired content 50 in window 46 comprises motion video from any number of sources, such as raw video, a camera, HDTV (e.g. 1280×720 pixels/frame, 60 fps), digital video (352×240 pixels/frame, 30 fps), video conference (352×240 pixels/frame, 30 fps), or broadcast video (e.g. 720×480 pixels/frame, 30 fps), or web video.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A network apparatus in a collaboration system with a plurality of participants, the apparatus comprising: a processing structure; and a memory including computer program code, wherein said memory and said computer program code are configured, with said processing structure, to cause the network apparatus to at least:
    present content on a display coupled to said processing structure;
    select a portion of said display for sharing, said portion having shared content comprising motion video;
    simultaneously send said shared content for presentation on said display and to an encoder for encoding said shared content;
    automatically discover a network server configured to distribute said shared content with said plurality of participants;
    couple said apparatus to said network server and transmit said shared content to said network server for distribution to at least one of said plurality of participants; and
    whereby said shared content is encoded and decoded, and displayed in real-time and said video appearing in said portion of said display is encoded and distributed to said plurality of participants without the use of screen grab techniques for capturing video.

2. The network apparatus of claim 1 wherein said video is encoded in real-time using at least one codec for transmission to a remote network apparatus of at least one of said plurality of participants, and wherein said video is decoded for real-time playback at said remote network apparatus.

3. A method of sharing content presented on a first graphical user interface (GUI) in real-time, the method having the steps of:
  (a) on said first GUI, selecting at least one area having a content for sharing, the content comprising motion video;
  (b) simultaneously sending said content present in said at least one area to said first GUI for presentation thereon and to an encoder, said encoder encoding said content using a least one codec;
  (c) transmitting said encoded content to a computing entity configured to distribute said encoded content to at least one recipient wherein said video appearing in said area of said GUI is encoded and transmitted to said computing entity without the use of screen grab techniques for capturing video;
  (d) decoding said encoded content with said at least one codec at said at least one recipient;
  (e) presenting decoded content on a second GUI at said recipient,
  whereby said video is encoded and streamed to said at least one recipient via said computing entity in real-time.

4. The method of claim 3 wherein only the content encompassed within said area is sent to said encoder, thereby minimizing encoding and de-coding resources and bandwidth resources.

5. The method of claim 4 wherein said decoded content is presented at said second GUI in an area similar to that on said first GUI.

6. The method of claim 5 wherein said area on said first GUI and second GUI is scalable.

7. The method of claim 3 wherein said area on first GUI defined by a scalable window frame, and wherein a selection of said at least one recipient may be performed via a dialog box associated with said window frame such that said selection is made directly from said window frame.

8. The method of claim 3 wherein said video is simultaneously shared during an active collaboration session.

9. The method of claim 7 wherein said scalable window frame defines a portion of said GUI or the entire GUI.

10. The method of claim 9 wherein said encoder receives the entire GUI and only encodes said content in said window frame.

11. A non-transitory machine-readable medium comprising coded instructions, said instructions executable by a processor, said coded instructions comprising:
  (a) a first set of instructions coded to determine the availability of a video application server in a collaboration system;
  (b) a second set of instructions coded to couple a computing device to said video application server, said first set of instructions having at least a network address of said video application server, or having the ability to discover said address through a network service;
  (c) a third set of instructions coded to select a portion of a display associated with said computing device, said portion having content for sharing comprising motion video;
  (d) a fourth set of instructions coded for simultaneously sending said shared content to said display for presentation thereon and directing same said shared content to an encoder;
  (e) a fifth set of instructions coded to encode said shared content;
  (f) a sixth set of instructions coded to transmit said encoded shared content in real-time to said video application server for distribution within said collaboration system; and
  whereby said content is shared in real-time and said video appearing in said portion of said display is encoded and transmitted to said video application server without the use of screen arab techniques for capturing video.

12. The non-transitory machine-readable medium of claim 11 wherein said content for sharing comprises video, and said processor having further instructions to receive coordinates of said portion of said display encompassing said content for sharing, such that only the content appearing within said coordinates is encoded via at least one codec in real-time.

13. The non-transitory machine-readable medium of claim 12 wherein said encoded content is distributed to participants in said collaboration system, and wherein said encoded content is decoded at another computing device at said participants.

14. The non-transitory machine-readable medium of claim 11 wherein said the shared content is sent directly to said participants by bypassing said video application server.

15. The non-transitory machine-readable medium of claim 12 wherein said coordinates define a window frame having said content, and wherein a command executed from within said window frame launches a dialog box having a menu with sharing options.

16. The non-transitory machine-readable medium of claim 15 wherein said sharing options comprises choosing one of at least one participant or a group of participants, to receive said shared content.

17. In a conferencing system operating over a distributed computer network, a method of sharing desktop content at an originating computer with at least one recipient computer in real-time, the system comprising:
  said originating computer comprising a content within at least one selected display region thereof that is to be shared with said at least one recipient computer, said content comprising motion video;
  a network server for distribution of said shared content;
  at said client computer, a processing structure and a memory including computer program code, wherein said memory and said computer program code are configured, with said processing structure, to cause said originating client computer to at least:
    at said processing structure, receive the coordinates of an area encompassing said at least one selected display region having said shared content;
    simultaneously send said shared content to said display for presentation thereon and direct same said shared content to an encoder;
    encode only said shared content encompassed within said at least one selected display region in real-time;
    automatically discover said network server;
  transmit said encoded shared content to said network server for distribution to said one at least one recipient computer, such that said shared content is decoded by said at least one recipient computer, and displayed in real-time; and
  whereby said video appearing in said at least one selected display region is encoded and transmitted to said at least one recipient computer without the use of screen grab techniques for capturing video and transmitting only said encoded content within said area minimizes encoding and de-coding resources and bandwidth resources.

18. The conferencing system of claim 17 wherein a dialog box is activated via a command invoked from an interaction with said at least one selected display region, said dialog box having a plurality of sharing options.

19. The conferencing system of claim 18 wherein said command is a user input including one a mouse-click or a touch gesture on said at least one selected display region.

20. The conferencing system of claim 19 wherein said plurality of sharing options comprises a selection of a participant associated with said one at least one recipient computer.

21. The conferencing system of claim 20 wherein said selection of a participant comprises a directory having a list of individual participants and/or group lists of participants.

\* \* \* \* \*